BINARY ADD-SUBTRACT DEVICE

Filed July 12, 1943 3 Sheets-Sheet 1

INVENTORS
GEORGE C. HARTLEY
LESLIE B. HAIGH
WILLIAM J. REYNOLDS
BY Edward [signature]
Attorney June 24, 1952 G. C. HARTLEY ET AL 2,601,281

BINARY ADD-SUBTRACT DEVICE

Filed July 12, 1943 3 Sheets-Sheet 2

INVENTORS
GEORGE C. HARTLEY
LESLIE B. HAIGH
WILLIAM J. REYNOLDS

BY E. D. Phinney

ATTORNEY

BINARY ADD-SUBTRACT DEVICE

Filed July 12, 1943 3 Sheets-Sheet 3

INVENTOR
GEORGE C. HARTLEY
LESLIE B. HAIGH
WILLIAM J. REYNOLDS
BY [signature]
ATTORNEY Patented June 24, 1952 2,601,281

UNITED STATES PATENT OFFICE 2,601,281

BINARY ADD-SUBTRACT DEVICE

George Clifford Hartley and William John Reynolds, London, England, and Leslie Baines Haigh, West Orange, N. J., assignors, by mesne assignments, to International Standard Electric Corporation, New York, N. Y., a corporation of Delaware Application July 12, 1943, Serial No. 494,282
In Great Britain April 24, 1941

Section 1, Public Law 690, August 8, 1946
Patent expires April 24, 1961

1 Claim. (Cl. 235—61)

Figure 1:
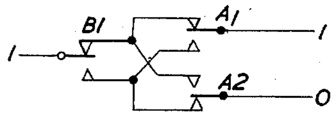

This invention relates to binary add-subtract device.

In application Serial No. 491,136, filed June 17, 1943, now Patent No. 2,397,604, means has been described for transmitting an indication such as a bearing to a distance by converting the bearing or other indication into the form of a number expressed in radix two. Such a number will have 2 as a base instead of 10, which is the base of the ordinary numbering system. Each denomination of a number in radix two is either 0 or 1. When 1 is added to a digit of a radix two number and the resultant comes to more than 1, 0 is entered and 1 is carried to the next denomination. The radix two numbers corresponding to radix ten numbers from 1 to 12 are as follows:

| Radix ten | Radix two | Radix ten | Radix two |
|---|---|---|---|
| 1 | 1 | 7 | 111 |
| 2 | 10 | 8 | 1000 |
| 3 | 11 | 9 | 1001 |
| 4 | 100 | 10 | 1010 |
| 5 | 101 | 11 | 1011 |
| 6 | 110 | 12 | 1100 |

In many cases it may be found necessary to apply a correction to the bearing or indication transmitted in accordance with said application or to transmit a bearing or indication that is some function of an original bearing or indication. This may be carried out by means of the present invention, by acting upon the representation of the bearing as a number expressed in radix two.

According to one feature of the present invention we provide electrically operated calculating equipment comprising means for automatically performing calculating operations in radix two.

As noted above there are only two possible values for any digit of a number expressed in radix two, namely 1 and 0. Accordingly the value of a digit of a number expressed in radix two can be represented by the operated or unoperated condition of a relay, the relay being operated if the value be 1 and unoperated if the value be zero. It is, of course, to be understood that the digital value could be represented by means of the two different conditions of operation of a polarised relay. The operated or non-operated condition of a simple, unpolarised relay is, however, preferred for economic reasons, as polarised relays are relatively expensive.

A number expressed in radix two possesses a much larger number of digits (approximately three times) than the number of the same value expressed in radix ten, i. e. the normal decimal notation for a number, but the simplicity of representation of a digital value, and (as will be hereinafter apparent) the simplicity of the calculating operations when performed in radix two compared with those performed in radix ten result in considerably cheaper equipment and in more rapid operation than in the case of calculating equipment in which the calculations are performed in radix ten.

According to another feature of this invention we provide means for automatically performing calculations upon numbers expressed in radix two.

A number may be expressed in radix two for the purpose of performing a calculation thereupon by being represented by the conditions of relays, one for each digit, each relay being operated or unoperated according as the corresponding digital value is 1 or 0 respectively.

According to yet another feature of this invention electrically operated calculating equipment comprises means for entering into said equipment numbers expressed in radix two and for automatically performing calculations upon said numbers.

A number expressed in radix two may be entered into the calculating equipment by connecting ground potential or no potential to a plurality of wires, one for each digit of the number, by means of the apparatus described in application Ser. No. 491,136 referred to above.

According to still another feature of the invention, electrically operated calculating equipment comprises means for representing in radix two numbers entered therein and for automatically performing calculating operations upon said numbers and for obtaining the solution thereof as a number expressed in radix two.

According to another feature of this invention electrically operated calculating equipment comprises two sets of relays, each set representing by the operated and unoperated conditions of the said relays a number expressed in radix two and electrical circuits comprising contacts of the said relays for representing the solution of a calculation performed on said numbers as a combination of potentials applied to a set of wires.

Figure 5:
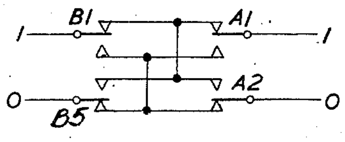
Figure 6:
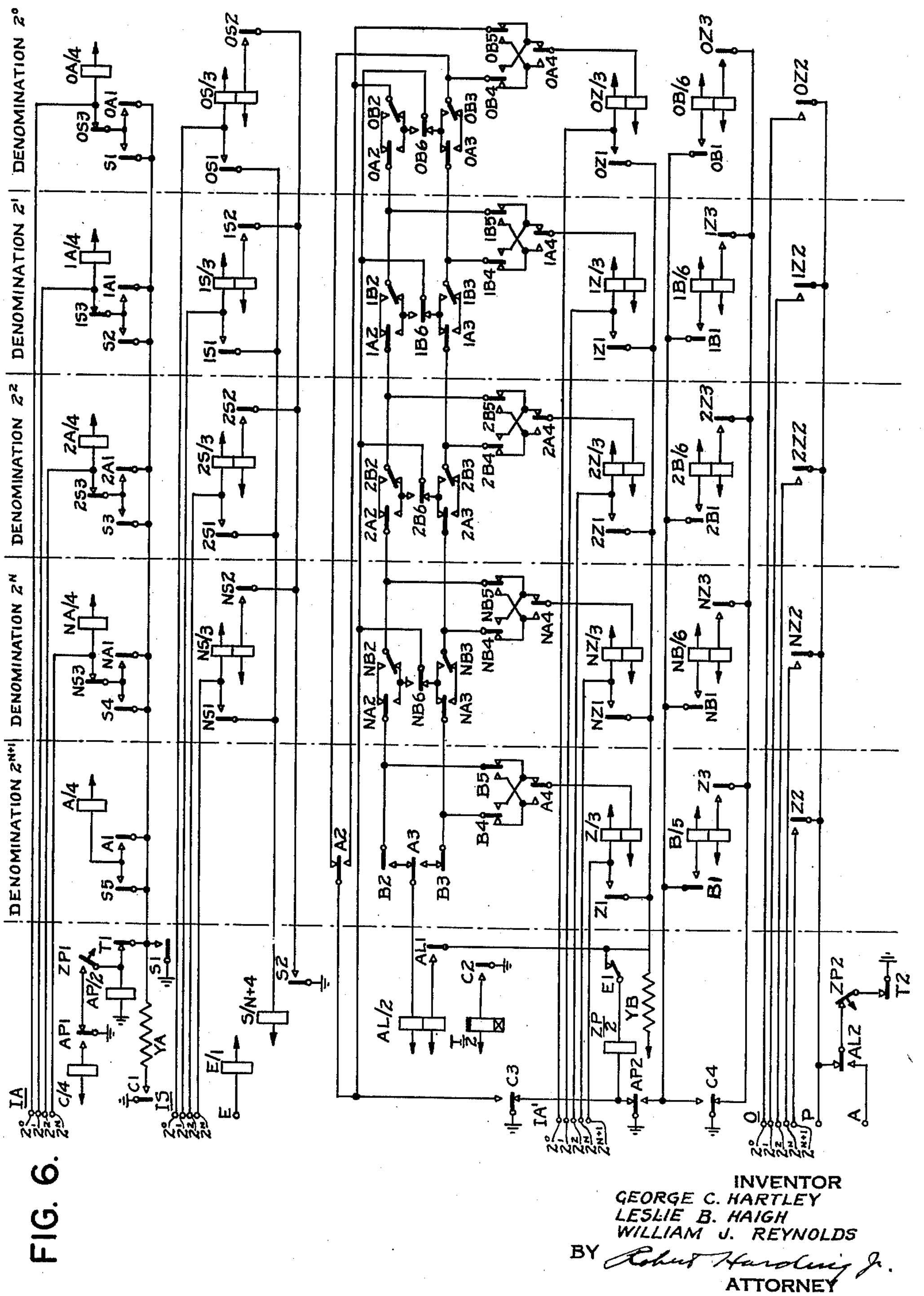

The nature of the invention will be better understood from the following description taken in conjunction with the accompanying drawings in which Figs. 1, 2, 3, 4A and 5 are diagrams of relay contacts and associated circuits illustrating how electric circuits may be used for performing addition and subtraction operations in radix two; Fig. 4 is a circuit diagram of an electric circuit for adding or subtracting two numbers expressed in radix two; whilst Fig. 6 is a circuit diagram of as much of the circuits of an electrically operated calculating equipment for adding and/or subtracting a succession of numbers as is necessary for the illustration of the present invention.

Before considering the accompanying drawings it is desirable to consider the nature of the results obtained when operating in radix two to add or subtract two digital values. The results of these operations in the case of a given pair of digital values depend upon whether a value has been carried over from a lower denomination in the case of addition or borrowed by a lower denomination in the case of subtraction.

The following table shows the possible results of operating on digital values, which, to fix ideas will be noted as A and B respectively, in a particular denomination.

| Carried from or borrowed by next lower denomination | Digital Values | | Addition | | Subtraction | |
|---|---|---|---|---|---|---|
| | 1st factor | 2nd factor | Sum | Carry to next higher denomination | Difference $A-B$ | Borrow from next higher denomination |
| | A | B | $A+B$ | | | |
| 0 | 0 | 0 | 0 | 0 | 0 | 0 |
| 1 | 0 | 0 | 1 | 0 | 1 | 1 |
| 0 | 0 | 1 | 1 | 0 | 1 | 1 |
| 1 | 0 | 1 | 0 | 1 | 0 | 1 |
| 0 | 1 | 0 | 1 | 0 | 1 | 0 |
| 1 | 1 | 0 | 0 | 1 | 0 | 0 |
| 0 | 1 | 1 | 0 | 1 | 0 | 0 |
| 1 | 1 | 1 | 1 | 1 | 1 | 1 |

Considering the above table more in detail the first line of figures is self-evident. For the second line, the addition items are self-evident. The subtraction items may be seen to be true, if it be considered that, as 1 has been borrowed to allow of a subtraction being performed in the next lower denomination, a digital value 1 must now be subtracted from a digital value 0. This cannot be performed without borrowing, consequently 1 must be borrowed from the next higher denomination as shown in the last column of the table. This digital value 1 when borrowed and transferred to the digital value under consideration becomes two (10), and thus the subtraction results in a digital value of 1 being entered in the answer as indicated in the penultimate column of the table.

A similar analysis will show the correctness of the remaining items in the table. One result shown in the above table is that the digital value to be entered in the answer for any particular denomination is the same for $A+B$ as for $A-B$.

In the drawings, relays have been designated by a letter or letters followed by a slanting line and a number, the number representing the number of contacts which are physically controlled by the relay. These contacts are shown distributed over the various figures in the circuits which they control, rather than in close association with the relays to which they belong. The contacts are designated by the letter or letters of the relay to which they belong followed by a number to differentiate the contacts of the same relay. This arrangement avoids a complex wiring diagram and makes the drawing easier to read and understand.

Referring now to the drawings, Fig. 1 shows how the operations of addition or subtraction in radix two may be performed by means of an electric circuit. In Fig. 1 there are represented contacts A1 and A2 of a relay A, not shown, and contacts B1 of a relay B, not shown. Digital values to be added are denoted by the conditions of relays A and B and thus by the conditions of their contacts and may represent digital values A and B of the table given above. A relay is operated for a digital value of 1 and unoperated for a digital value of 0. A ground upon the wire 1 on the right of the figure indicates that there has been carry-over from or borrowing by the next lower denomination, and a ground upon the wire 0 that there has been no such carry-over or borrowing. It will be seen that one or the other of these grounds will be extended to the wire marked 1 on the left of the drawing if the digital value to be entered in the answer for the sum or difference (including the carry-over or borrow conditions) is 1 and that no ground will appear on this wire if the entry in the answer is to be zero. Thus, if there is a ground applied to the wire 1 at the right because 1 is to be carried from or borrowed by the next lower denomination, then, with the two relays unoperated, as shown, representing 0 for both values A and B, the wire 1 at the left will have a ground through the back contacts of the relays, indicating that the sum or difference is 1. If both the values A and B are 1 and the relays are thus both operated, the ground will be delivered to the wire 1 at the left through front contacts A1 and B1. But if either one of the relays is operated and the other not operated, no ground will be delivered to the wire at the left, indicating that the digital value of the sum is 0. The ground on wire 1 on the left may be extended to any apparatus by which it is desired that the digital value in the answer may be expressed, such as the winding of a relay or an electric lamp or like indicator. It will be noted that in Fig. 1 the contacts of A and B are interchangeable; in other words contacts A1 and A2 could be replaced by similarly connected contacts of relay B, if contacts B1 are replaced by similarly connected contacts of relay A.

Figure 2:
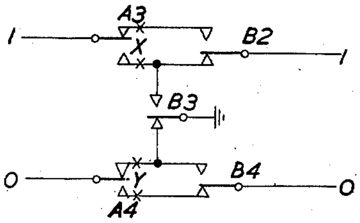

Fig. 2 shows a circuit for realising the conditions of carry-over in the case of additions. As in Fig. 1 the digital values to be added are denoted by the conditions of relays A and B (not shown) and thus by the conditions of their contacts A3 and A4, and B2, B3 and B4. Ground on the wire 1 or the wire 0 on the right of the figure is an indication that a digital value of 1 or 0 respectively has been carried over from the next lower denomination. The relay contacts shown extend this ground, in accordance with their conditions to wire 1 or wire 0 on the left of the drawing according as the value to be carried over to the next higher denomination is 1 or 0 respectively. Thus, if the relays are both unoperated because the digital values of A and B are both 0, then ground is delivered to the wire marked 0 at the left from the ground which is shown connected to the moving contact of B3, through B3 back and A4 back, indicating that 0 is to be carried to the next higher denomination. It is then immaterial as to whether or not the wires 1 and 0 at the right have grounds applied to them. If the relays are both operated because the digital values of A and B are both 1, the ground on B3 will be delivered to the wire marked 1 at the left, indicating that 1 is to be carried over to the next denomination. Again the condition of the wires 1 and 0 on the right is immaterial. But, if only one of the relays A and B is operated, then the condition of the wires 1 and 0 on the right will determine which of the wires 1 and 0 on the left will have a ground applied to it. For instance, if A is operated and B is not, then a ground on wire 1 at the right will be carried to wire 1 at the left through back contacts B2 and front contacts A3, while a ground on wire 0 at the right will be carried to wire 0 at the left through back contacts B4 and front contacts A4.

Inspection of the table given above will show that the conditions such that a digital value of 1 is to be borrowed from the next higher denomination in the case of subtraction are not identical with the conditions in which a digital value of 1 is to be carried over to the next higher denomination in the case of addition, and hence a different circuit is necessary for subtraction.

Figure 3:
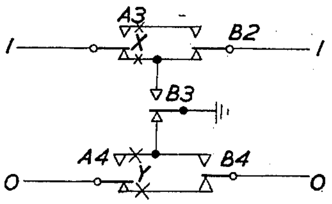
Figure 4:
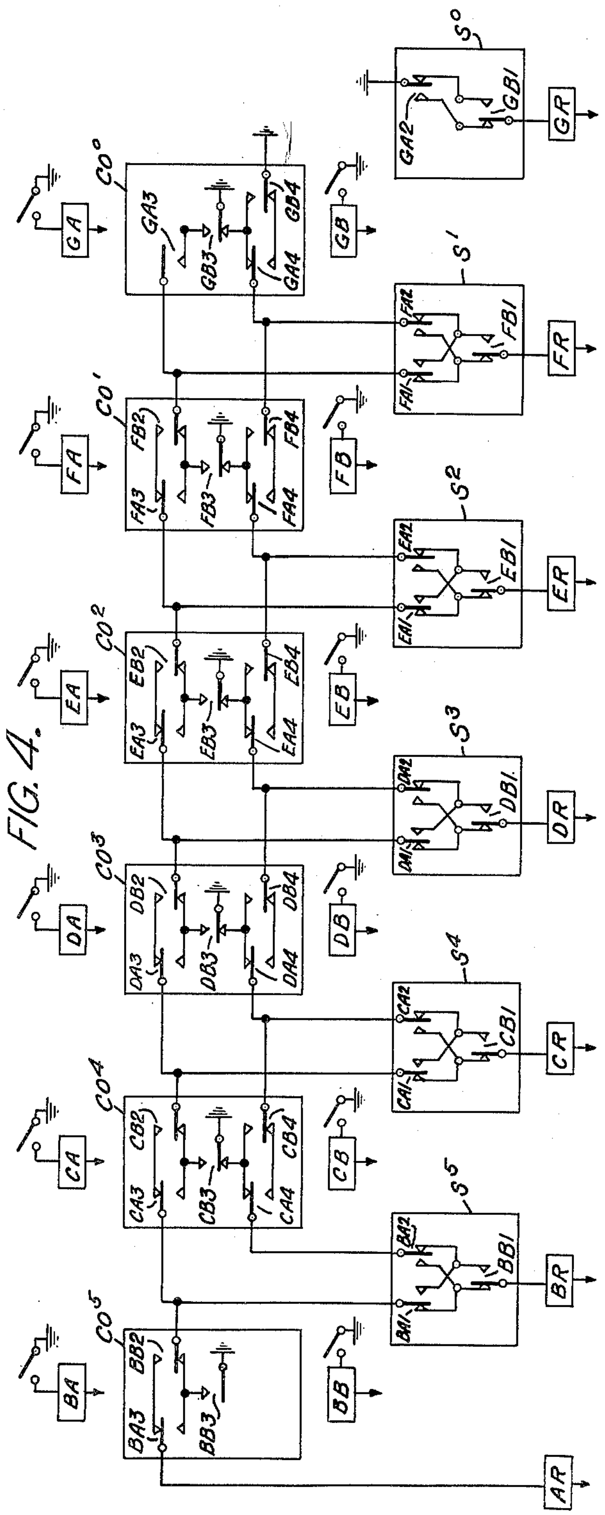

Fig. 3 shows a circuit for determining the value of the digital value to be borrowed from the next higher denomination, the conventions being similar to those of Fig. 2. In Fig. 3, if neither relay A or B is operated, the ground conditions of the wires 1 and 0 at the right are transformed to the wires 1 and 0 at the left while if one of the relays is operated without the other, the ground at B3 will be delivered to one or the other of the wires 1 and 0 at the left. This is in conformity with the values given in the table.

Inspection of Figs. 2 and 3 will show that Fig. 2 may be converted into Fig. 3 by reversing the connections to contacts A3 and also those to contacts A4 at the points marked X and Y respectively. In other words, if at the points so marked a wire connected to a back contact of A is connected to a front contact, and vice versa, the circuit of Fig. 2 becomes that of Fig. 3. It follows also that a similar interchange at the points X and Y in Fig. 3 results in the circuit of Fig. 2.

From the above it will be seen that a circuit for performing addition may be converted into a circuit for performing subtraction by interposing at the points X and Y in Fig. 2 contacts of a relay which is, for example, unoperated to indicate an addition operation and operated to indicate a subtraction operation, the back contacts of the relay causing the connections to be as in Fig. 2 and the front contacts of the relay causing the connections to be as in Fig. 3.

According to another feature of this invention we provide means for automatically performing calculations upon numbers expressed in radix two.

A number may be expressed in radix two for the purpose of performing a calculation thereupon by being represented by the conditions of relays, one for each digit, each relay being operated or unoperated according as the corresponding digital value is 1 or 0 respectively.

According to yet another feature of this invention electrically operated calculating equipment comprises means for entering into said equipment numbers expressed in radix two and for automatically performing calculations upon said numbers.

A number expressed in radix two may be entered into the calculating equipment by connecting ground potential or no potential to a plurality of wires, one for each digit of the number, by means of the apparatus described in application Ser. No. 491,136 referred to above.

According to still another feature of the invention, electrically operated calculating equipment comprises means for representing in radix two numbers entered therein and for automatically performing calculating operations upon said numbers and for obtaining the solution thereof as a number expressed in radix two.

Fig. 4 shows how an addition or subtraction operation may be performed upon two numbers represented in radix two and the solution obtained as a number expressed in radix two. It is assumed that a first number is expressed in radix two by means of a series of relays BA, CA, DA, EA, FA and GA. There is a relay for each digit and it is assumed for the purpose of illustration that the numbers to be operated upon contain a maximum of six digits each. The number referred to may be entered in radix two by means of the apparatus referred to above but is in any case represented by the combination of the operated or non-operated conditions of relays BA . . . GA, a relay being operated for a digital value of 1 and not operated for a digital value of 0, relays BA and GA being assigned to the digits of highest, $2^5$, and lowest, $2^0$, denominations respectively. A second number is similarly represented by the combination of the operated or non-operated conditions of further relays BB, CB, DB, EB, FB and GB. Fig. 4 shows how the principle of the circuits of Figs. 1 and 2 may be used to obtain the sum of the two numbers as a number expressed in radix two and represented by the combination of the operated or non-operated conditions of relays AR, BR, CR, DR, ER, FR, GR, one for each digit in the number which is the solution. Each of the blocks denoted $S^0$ . . . $S^5$ is a circuit similar to (or slightly modified from, as will be explained) that of Fig. 1, whilst each of the blocks denoted $CO^0$ . . . $CO^5$ is a circuit similar to that of Fig. 2. In each case the contacts included in the circuit are shown in the block.

Commencing with the digit of lowest denomination, i. e. denomination $2^0$, the digital values to be added are denoted by the conditions of relays GA and GB. The block denoted $S^0$ with contacts GA2 and GB1 therein accordingly represents a circuit similar to that of Fig. 1 constructed with contacts of relays GA and GB but simplified by omitting any conditions of carry over from a lower denomination, i. e. by omitting the contacts of GA corresponding to contacts A1. If one (but not both) of relays GA and GB is operated ground appears upon the outgoing wire connected to relay GR and battery, and relay GR operates to indicate a digital value of 1 in the solution; otherwise relay GR does not operate and a digital value of 0 is thus indicated.

For the digit of next higher denomination, i. e. denomination $2^1$, any carry over resulting from the addition of the values of the digits of lowest denomination $2^0$ must be added to the sum of the two digital values to be added. The block marked $CO^0$ in which the contacts GA3, GA4, GB3 and GB4 appear accordingly represents a circuit like that shown in Fig. 2 with contacts of relays GA and GB therein and simplified by the omission of any conditions for carry over from a lower denomination. Thus the contacts of GB corresponding to B2 are omitted. The output wires from the left of this circuit are connected to the circuit represented by blocks $S^1$ in which appear the contacts FA1, FA2 and FB1, which is the circuit of Fig. 1 applied to determine the digital value appearing in the solution in denomination $2^1$ and corresponding to the sum of the digital values represented by the conditions of relays FA and FB. Relay FR connected to this circuit accordingly denotes by its operation or non-operation the corresponding digital value 1 or 0 in the solution in denomination $2^1$.

Again, for the digit in the solution in denomination $2^2$ the output of the carry-over circuit $CO^1$ for FA and FB is connected to the input of the sum circuit $S^2$ (like that of Fig. 1) incorporating contacts EA1, EA2 and EB1 of relays EA and EB. The output of this latter circuit is connected to relay ER which indicates by its condition the digital value in the solution in denomination $2^2$.

It will be seen that similar connections determine the conditions of relays DR, CR and BR for the digits in denominations $2^3$, $2^4$, and $2^5$, respectively, of the solution. The digit of highest denomination $2^6$ of the solution is denoted by the condition of relay AR which is determined directly by the output from the carry over circuit $CO^5$ including contacts BA3, BB2, and front contacts BB3. The contacts corresponding to contacts A4 and B4 of Fig. 2, which would be designated BA4 and BB4, are omitted in this case, since no carry-over to a higher denomination is needed.

Figure 4A:
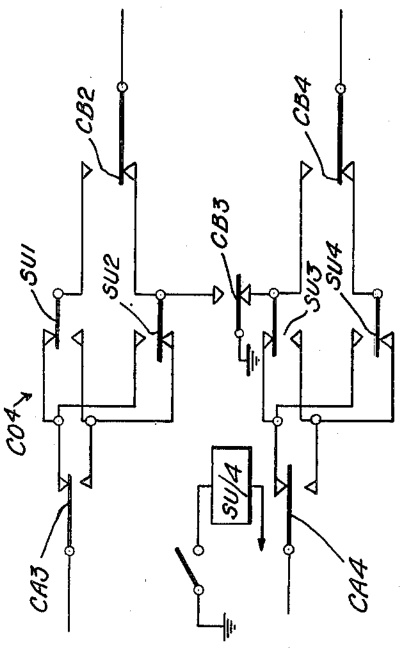

The circuit of Fig. 4 may be used to give the solution for either an addition or a subtraction operation by interposing in each carry-over circuit contacts of a subtraction relay at the points indicated in Fig. 2 by X and Y. In Fig. 4A a relay SU/4 is shown for making this change-over in the connection of the contacts in one of the carry-over circuits, the circuit $CO^4$ being chosen as an illustration, and it will be understood that there will be such a relay in each of the carry-over circuits. When the relay is not operated, back contacts SU1, SU2, SU3, and SU4, connect the circuit as in Fig. 2, but when the relay is operated, front contacts SU1, SU2, SU3, and SU4 connect the circuit as in Fig. 3. The relays SU, therefore, are operated only when the operation of subtraction is desired.

According to another feature of this invention electrically operated calculating equipment comprises two sets of relays, each set representing by the operated and unoperated conditions of the said relays a number expressed in radix two and electrical circuits comprising contacts of the said relays for representing the solution of a calculation performed on said numbers as a combination of potentials applied to a set of wires.

In Fig. 4 a set of wires, one for each digit, connected to relays AR . . . GR is shown and a digital value is expressed by the presence or absence of ground potential on the said wire. If it is required to display the number representing the solution, this may be done by causing the relays AR . . . GR to close over their front contacts the circuits of lamps to show the digital values, and if desired, the circuits of lamps to show the digital values 0 may be closed over back contacts of the same relays. As an alternative, however, it is possible to modify the circuit of Fig. 4 to provide two outlet wires for each digit, a digital value of 1 being represented by ground potential on one wire and a digital value of 0 by ground potential on the other wire. For this purpose, each circuit $S^0$ . . . $S^5$ is modified as shown in Fig. 5 in which another set of back and front contacts, B5, are provided for the additional output wire, the output wire is connected to the movable arm, while the back contact is connected to the back contact of A2 and the front contact is connected to the back contact of A1. The potential applied to one or other of the input wires on the right is thus extended to one or other of the output wires on the left according as the digital value to be entered in the answer is 1 or 0 respectively.

Fig. 6 shows the circuits of one form of an electrically operated calculating equipment in which numbers may be entered successively. The equipment may be adapted for numbers of any desired number of digits. The circuits for the digits from the lowest denomination $2^0$, intermediate denominations $2^1$, $2^2$ and the highest denomination $2^N$ of numbers to be entered therein are shown. The circuits for a digit of denomination $2^{N+1}$ to provide for carry over into that denomination are also shown.

The terminals shown on the left of the drawing at 1A, $1A^1$ and IS are those to which potentials are applied from an external control circuit in order to enter numbers into the equipment and the terminals shown at 0 are those upon which potentials are applied by the equipment to represent the solution obtained. The circuits belonging to digits of a particular denomination are all arranged in a column headed with the value of that denomination, whilst relays for controlling the sequence of operations are shown in the left hand column.

The relay ZP (lower left) is normally operated in a circuit from battery, resistance YB, E1 back, winding of ZP, C3 back and AP2 back in parallel to ground. At ZP2, front (shown operated at the bottom of the figure), ground is maintained over T2 back and AL2 back on terminal P to indicate that a number may be entered, as, for instance, by completing the circuit of lamp connected to terminal P.

Numbers are entered in radix two. The first number to be entered may be entered by means of terminals $IA^1$ or terminals IA. Subsequent numbers must be entered on terminals LA for addition or on terminals IS for subtraction. In each case the number is expressed in radix two by applying ground potentials to those terminals corresponding to digits of the value 1.

*Addition*

Suppose that the first number is entered on terminals $IA^1$ by connecting ground to certain of the IA1 terminals by means of corresponding keys, not shown. Aggregate relays Z, NZ . . . 0Z corresponding to digits of value 1 operate, and close locking contacts Z1, NZ1 . . . 0Z1, over which therefore ground is extended to short circuit relay ZP. This ground remains whilst any key remains actuated and ZP thus releases and removes ground from terminal P. Contacts Z3, NZ3 . . . 0Z3 operate corresponding aggregate retaining relays B, NB . . . 0B, which, however, perform no function at present. Relays Z1, NZ . . . 0Z lock in series with relays ZP when ground is removed from the corresponding line IA1 via AP2 or C3, winding of ZP, 0Z1, winding of 0Z, battery. The relays B, NB . . . 0B are picked up over the back contact C4.

A second number is entered on terminals IA and relays NA . . . 0A corresponding to digital values 1 are operated. This action may follow or overlap the entry of the first number. When the grounds representing the first number are removed ZP reoperates and replaces ground on terminal P. Relays NA . . . 0A close their contacts NA1 . . . 0A1, and when the grounds are removed from terminals IA, relay AP operates in series with any of the relays NA . . . 0A that have been operated. This circuit is traced from ground, through winding of AP, T1 back, 0A1 front, 0S3 back, to battery through winding of 0A, or similar circuits through the windings of such of the relays A . . . 0A as are operated. If the two numbers are being entered concurrently, relay AP cannot operate until ZP has re-operated, since until then it is kept short circuited over back contacts ZP1 and back contacts AP1.

Ground over front contacts AP2 (lower left), holds the operated aggregate retaining relays B, NB . . . 0B over their own front contacts independently of the contacts of the aggregate relays Z, NZ . . . 0Z. Front contacts AP1 (top left) close a circuit to operate the calculate relay C. Front contacts C1 (immediately below relay C) apply ground over resistance YA to hold the operated relays NA . . . 0A independently of contacts T1. This ground shunts relay AP, which, however, does not release because of the resistance YA. Back contacts C4 (lower left) open the energizing circuits for the aggregate retaining relays B, NB . . . 0B, but those which are operated remain locked over front contacts B1, NB1 . . . 0B1 respectively, and AP2 front to ground, and later over C4 front to ground.

At back contacts C3 (center left) the circuit for ZP and the locking circuits for the aggregate relays Z, NZ . . . 0Z are opened. At front contacts C3 new circuits, built up as previously described with reference to Figs. 1, 2 and 4 are completed for the aggregate relays Z, NZ . . . 0Z, so that some or all of these relays now operate in accordance with the new aggregate. Suppose, for example, the first number entered on wires IA1 be 101 then relays 2Z and 0Z operate originally and cause the operation of relays 2B and 0B. Suppose also the second number entered on wires IA be 111. Then relays 2A, IA, and 0A operate. After relays 2Z and 0Z release, fresh circuits are completed for relays of the series NZ . . . 0Z, representing the sum of 101 and 111. This sum would be arrived at on paper thus:

$$\begin{array}{r} 101 \\ 111 \\ \hline 1100 \end{array}$$

In order to produce this result relays NZ and 2Z operate in the following circuits (these circuits may be traced by considering the column containing NZ as equivalent to $2^3$ denomination for the purpose of demonstrating this simple calculation): Battery, lower winding NZ, contacts NA4 back, contacts NB5 back, contacts 2A2 front, contacts 2B6 front, contacts C3 front, ground. Battery, lower winding 2Z, 2A4 front, 2B5 front, IA2 front, IB2 back, 0A2 front, 0B6 front, C3 front, ground. The operation of the relays NZ and 2Z place grounds from terminal P on the proper wires, $2^3$ and $2^2$ of the resultant wires 0, as will be later described.

Relay ZP upon releasing opens the circuit to the pilot terminal P. Relay C at front contacts C2 (center left) closes a circuit for a slow-to-operate timing relay T. When relay T operates, which it does not do until sufficient time has elapsed to permit the aggregate relays Z, NZ . . . 0Z to release or operate, the circuit for relay AP is broken by contacts T1 shown adjacent that relay. Relay AP releases and at contacts AP1 breaks the circuit for relay C. At contacts AP2 back a locking circuit is closed for the operated ones of the relays Z, NZ . . . 0Z in series with relay ZP. At contacts C1 (upper left) the locking circuit for the operated addition factor relays NA . . . 0A are broken and these relays release. At contacts C4 (lower left) the locking circuits for the operated aggregate retaining relays B, NB . . . 0B are broken and new circuits are closed in accordance with the new aggregate over contacts Z3, NZ3 . . . 0Z3 for a new selection of these relays. At contacts C2 (center left) the circuit of relay T is broken.

When relay T has released, which it does not do until time has been given for the addition factor relays NA . . . 0A to release, ground potential is applied to a combination of terminals 0 in accordance with the new aggregate (ground, T2 back, ZP2 front, AL2 back, operated contacts Z2, NZ2 . . . 0Z2) and also to terminal P, thus indicating a number which is the sum in radix 2 of the two numbers entered at terminals $IA^1$ and IA, respectively. Thus, for the number 1100 which is the sum of 101 and 111 (all being expressed in radix two) ground will be connected to terminals $2^2$ and $2^N$ of the set of terminals 0 over front contacts 2Z2 and NZ2, respectively, AL2 back, ZP2 front, and T2 back.

It will be seen that if the first number be entered on terminals IA, instead of $IA^1$ it will be transferred to the aggregate relays NZ, 0Z and the aggregate retaining relays NB, 0B. The aggregate (being then only the single number that has been entered) will appear on the terminals 0. Thus, if the number 1001 be entered on the terminals IA and it be assumed that the thousand denomination be $2^N$, then relays NA and 0A will operate. This will cause relay NZ to operate from battery through the lower winding of NZ, NA4 front, NB4 back, 2A3 back, 2B6 back, C3 front, to ground. Relay 0Z will also operate from battery, through the lower winding of 0Z, 0A4 front, 0B4 back, A2 back, C3 front, to ground.

The operated aggregate relays Z . . . 0Z, and the operated aggregate retaining relays B . . . 0B remain operated until a further number is entered into the equipment, or until ground is applied to terminal E (upper left). The latter operated relay E, which at contacts E1 (left lower center) breaks the locking circuits for the operated aggregate relays and the relay ZP. These last mentioned relays release and release the operated aggregate retaining relays B . . . 0B.

It makes no difference when the entries of numbers are affected all at once or digit by digit. The AP relay is energized as soon as any digit is entered in the A relays and the relay C is picked up and a calculation proceeds to take place. Suppose the number 111 were to be entered on the IA leads and the $1^2$ denomination were entered first. Calculation would proceed and the solution 100 would appear on the 0 leads. Then suppose the 1 in the $2^0$ denomination were entered. Calculation would again proceed and 1 in the $2^0$ denomination would appear in the solution leads 0. In the same manner the insertion of 1 in the $2^1$ will produce calculation and produce a 1 in the $2^1$ of the solution. Any number to be added can be entered in this manner and will produce the correct result. If however, the ground is still on any one of the entering leads IA, the relay AP will not be operated, since it is shorted by that particular lead. Hence no calculation will take place until all of the input leads IA are free of grounds. In the event the digits of a multi-edge item are entered sequentially, adequate time must be provided between every two successive digit entries. It is the function of signal line P to prevent premature entry of successive numbers, or individual digits, if they are treated as complete numbers in themselves.

*Subtraction*

The operation of the circuits for subtraction can best be followed by means of an example. As before stated, there is assumed to be in Fig. 6 a column for each denomination and thus the circuits for any denomination above $2^2$ can be followed by means of the circuits of NA, NS, NZ and NB in the column for denomination $2^N$ by merely considering N to be replaced by the appropriate denomination index. Suppose the minuend be 101 and it be entered on terminals IA1. Aggregate relays 2Z and 0Z operate as described above for the case of addition and cause the operation of the aggregate retaining relays 2B and 0B.

The minuend might however have been entered by means of terminals IA. In that case relays 2B and 0B also operate in the manner described for addition.

The subtrahend is entered by applying ground to a combination of the terminals IS which ground operates a combination of the subtrahend relays NS . . . 0S. If the minuend had been entered on the terminals IA the operator must wait for the lamp connected to terminal P to be lit before entering the subtrahend, but if the minuend is entered on terminals IA1, the subtrahend may be entered concurrently therewith. Suppose the subtrahend be 11. Then relay 1S and 0S operate. Over contacts 0S1 and 1S1 the grounds on the respective terminals of the set 1S are extended to relay S, which operates. These relays 1S, 0S and S remain operated so long as the entering grounds are maintained. At contacts S3, S4, S5 etc. circuits are closed for all relays of the set A, NA . . . 0A except those corresponding to the relays of the set NS . . . 0S that are operated. Assume that provision is made for entering six digit numbers, so that there are seven relays A, 5A, 4A, 3A, 2A, 1A, 0A. Relays A, 5A, 4A, 3A and 2A will operate. The circuit for relay A is from battery, winding of A, S5 front, T1 back, winding of AP, ground. The circuits for 5A, 4A, 3A and 2A are similar, the general circuit, that of NA, being over NS3 back, S4 front, T1 back, winding of AP, ground. There is no circuit for 0A (open at 0S3) or 1A (open at 1S3). Relays, A, 5A, 4A, 3A and 2A lock over contacts A1, 5A1 etc. independently of contacts of S.

When the grounds used for entering the subtrahend are removed relay S releases, followed by the relays 1S and 0S. Whilst relay S remains operated, relay AP is kept short circuited by contacts S1, but as soon as relay S releases, relay AP operates. Relay C then operates and at front contacts C3 circuits are closed for adding to the minuend (denoted by relays 2B and 0B being operated) the complement of the subtrahend denoted on relays, A, NA . . . 0A. It may be noted here that the device of performing subtraction in radix two by adding to the minuend the complement of the subtrahend is analogous to the known method of performing subtraction in radix ten by adding to the minuend a number obtained from the subtrahend by taking the complement with respect to nine of each digit of the latter, and adding 1 to the digit of lowest denomination. This addition of 1 in the lowest denomination $2^0$ is obtained by connecting ground from front contacts C3 over front contacts A2 to the circuits in the column $2^0$. The result of subtracting 11 from 111 is clearly 100 so that when this result appears on the Z relays Z, NZ . . . 0Z, only relay 2Z operates. If one attempts to trace the circuit for 0Z, for example, one proceeds, battery, lower winding of 0Z, 0A4 back, 0B4 front, and then, because contacts A2 are up there is no further circuit. Similarly there is no circuit for 1Z. The circuit for 2Z may be traced from battery, lower winding of 2Z, 2A4 front, 2B5 front, 1A2 back, 1B2 front, 0A2 back, 0B2 front, 2A front, C3 front, ground.

Theoretically the aggregate in the Z relays is too high by the digit 1 in denomination $2^{N+2}$ only, which does not appear in the calculator, and this device of pushing the fugitive 1 beyond the limits of the calculator is well known in calculators operating upon radix ten i. e. in the decimal system. It is the operated condition of contacts A4 and ensures that the aggregate in denomination $2^{N+1}$ is increased by 1 and thus the fugitive one pushed into denomination $2^{N+2}$.

When relay C operated, the circuit for relay T is completed as before at contacts C2. Relay T is slow operating and thus gives time for the calculating operation to be performed before it operates fully. When it has operated fully the locking circuits for the operated relays of the set A, NA . . . 0A and the circuit for AP are broken. Relay AP releases and breaks the circuit for relay C and at contacts AP2 closes a locking circuit for relay 2Z over relay ZP, contacts E1 back, 2Z1 front and upper winding of 2Z. When relay C releases, the circuits for the previously operated relays 2B, 1B and 0B are broken at contacts C4 and a fresh circuit is made for relay 2B over its lower winding and front contacts 2Z3. At contacts C2 the circuit for relay T is broken and when that relay has released, ground is reconnected to terminal P to indicate that a new numbers may be entered.

New numbers may then be entered into the calculator. If such a number is entered in terminals IA it is added to the existing aggregate, if entered in terminals IS it is subtracted from the existing aggregate.

An aggregate may be cancelled at any time by applying ground to terminal E, which operates relay E. At contacts E1 the circuit for any operated relay of the aggregate relays Z, NZ . . . 0Z is broken, as well as the circuit of relay ZP. When this ground on terminal E is removed the circuit returns to normal.

*Alarm*

Relay AL is provided in order to give an alarm and prevent any solution being given by the equipment, in cases in which it cannot perform the calculation. These cases are, for addition, when the solution exceeds the capacity of the equipment, and for subtraction when the result is negative. For addition, the solution exceeds the capacity of the equipment if there is a carry over of 1 from the denomination $2^{N+1}$ to the next higher denomination for which there is no provision. Ground on the wire joining contacts NA2 and B5 indicates a carry over of 1 to denomination $2^{N+1}$. This would arise either from the operation of both relays NA and NB, which would be operated when the denomination of $2^N$ of both numbers to be added is 1, or from the operation of one of these relays and the operation of both the corresponding relays in the next lower denomination. Ground on the wire joining contacts NA3 and B4 indicates the absence of such carry over. This would arise either from both relays NA and NB being un-operated or from one of these relays being operated but with no carry-over from the next lower denomination. If therefore there is such carry over and relay B is operated, there is also an attempted carry-over of 1 to denomination $2^{B+2}$ (which is not in the equipment) and relay AL is operated over front contacts $B^2$ and back contacts $A^3$. In subtractive operations, on the other hand, the relay AL is operated to show an overflow only when a true result is obtainable, that is, it does not operate when a true subtraction is not possible, due to the subtrahend being numerically larger than the minuend.

When relay AL operates, it locks over contacts AL1 to the ground holding the aggregate relays. Contacts AL2 (bottom left) remove the ground over ZP2 front which would otherwise be applied to a combination of terminals 0 to represent the solution; instead they connect this ground to terminal A to give an alarm which may be an electric light, if desired.

*Successive addition or subtraction*

Since the situation after an addition or subtraction operation is similar to the situation after a first number has been entered into the equipment and accumulated on the aggregate relays, it will be clear that a further number may be entered into the equipment either for addition or subtraction. Numbers may be entered into the equipment either for addition or subtraction without limit providing the capacity of the equipment is not exceeded. If the aggregate after a subtraction operation has been performed is negative, an alarm is given as stated above, but the record of the preceding transactions can be recovered by entering for addition the number last previously entered as a subtrahend. Similarly, if after an addition operation, the capacity of the calculator is exceeded, the previous aggregate can be recovered by entering as a subtrahend the number last previously entered.

What is claimed is:

An electrically operated calculating apparatus comprising a first array of two-position devices, means to enter a number expressed in radix two into said apparatus by changing the condition of the individual devices in said array, means for storing the number entered into said first array, a second array of two-position devices, means to enter a second number expressed in radix two into said apparatus by changing the condition of the individual devices in said second array, means for representing the number entered into said second array as a complement of itself if the difference of said first two numbers is required and directly as the number itself if addition is required, and means automatically co-operative with said last mentioned means and said second array to restore and reoperate the devices of said first array to represent either the sum or the difference of said numbers by the condition of the devices therein, said last named means including contacts operated by the devices in said second array and said storing means and a set of sum-or-difference contacts in each denomination to determine whether the sum or difference is to be taken, the digital representation of each denomination of said sum or difference being controlled only by contacts of the devices in the corresponding denominations including said sum or differences contacts and the contacts of a device in at least one preceding denomination.

GEORGE CLIFFORD HARTLEY.
WILLIAM JOHN REYNOLDS.
LESLIE BAINES HAIGH.

REFERENCES CITED

The following references are of record in the file of this patent:

UNITED STATES PATENTS

| Number | Name | Date |
|---|---|---|
| 2,191,567 | Hofgaard | Feb. 27, 1940 |
| 2,192,612 | Lang et al. | Mar. 5, 1940 |
| 2,318,591 | Couffignal | May 11, 1943 |
| 2,364,540 | Luhn | Dec. 5, 1944 |
| 2,375,332 | Torkelson | May 8, 1945 |
| 2,386,763 | Williams | Oct. 16, 1945 |

FOREIGN PATENTS

| Number | Country | Date |
|---|---|---|
| 410,129 | Great Britain | May 9, 1934 |